United States Patent
Priescu et al.

(10) Patent No.: US 11,917,017 B1
(45) Date of Patent: Feb. 27, 2024

(54) PRIORITIZED RESTORATION OF CONNECTIONS AND SESSIONS

(71) Applicant: Amazon Technologies, Inc., Seattle, WA (US)

(72) Inventors: Valentin-Gabriel Priescu, Seattle, WA (US); Abhimanyu Agarwal, Seattle, WA (US); Sudhir Venkata Dachepalli, Bellevue, WA (US); Zhiping Zhang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/936,537

(22) Filed: Sep. 29, 2022

(51) Int. Cl.
| | |
|---|---|
| *H04L 67/141* | (2022.01) |
| *H04L 67/145* | (2022.01) |
| *H04L 47/10* | (2022.01) |
| *H04L 47/62* | (2022.01) |
| *H04L 47/625* | (2022.01) |
| *H04L 67/14* | (2022.01) |

(52) U.S. Cl.
CPC ............ *H04L 67/141* (2013.01); *H04L 47/10* (2013.01); *H04L 47/62* (2013.01); *H04L 47/6255* (2013.01); *H04L 67/14* (2013.01); *H04L 67/145* (2013.01)

(58) Field of Classification Search
CPC ....... H04L 67/14; H04L 67/141; H04L 47/10; H04L 47/62; H04L 47/6255; H04L 67/145
See application file for complete search history.

(56) References Cited

U.S. PATENT DOCUMENTS

| 6,484,206 | B2 * | 11/2002 | Crump | H04L 67/14 |
| | | | | 370/467 |
| 6,693,913 | B1 * | 2/2004 | Chiussi | H04L 47/50 |
| | | | | 370/468 |
| 2002/0078208 | A1 * | 6/2002 | Crump | H04L 67/14 |
| | | | | 709/227 |
| 2003/0189896 | A1 * | 10/2003 | Dang | H04L 45/22 |
| | | | | 370/395.32 |
| 2009/0092048 | A1 * | 4/2009 | Liang | H04L 47/50 |
| | | | | 370/235 |
| 2009/0180478 | A1 * | 7/2009 | Yu | H04L 47/562 |
| | | | | 370/395.62 |
| 2011/0307546 | A1 * | 12/2011 | Iovene | H04L 45/22 |
| | | | | 709/203 |
| 2021/0359956 | A1 * | 11/2021 | Abdulla | H04L 47/6295 |

* cited by examiner

*Primary Examiner* — Ramy M Osman
(74) *Attorney, Agent, or Firm* — Knobbe, Martens, Olson & Bear, LLP

(57) ABSTRACT

Systems and methods are provided for prioritized restoration of multiple network connections that have been interrupted. Connection state data (e.g., quantity of pending IO requests) may be used to prioritize reestablishment of some connections over others. In addition, the connections may be reestablished using "in-band" handshakes over the previously-established network connections.

14 Claims, 6 Drawing Sheets

PRIORITIZED RESTORATION OF CONNECTIONS AND SESSIONS

BACKGROUND

Computing systems can utilize communication networks to exchange data. Companies and organizations operate computer networks that interconnect a number of computing systems to support operations or to provide services to third parties. When a network connection is interrupted, these operations and services are disrupted until the connection is restored.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
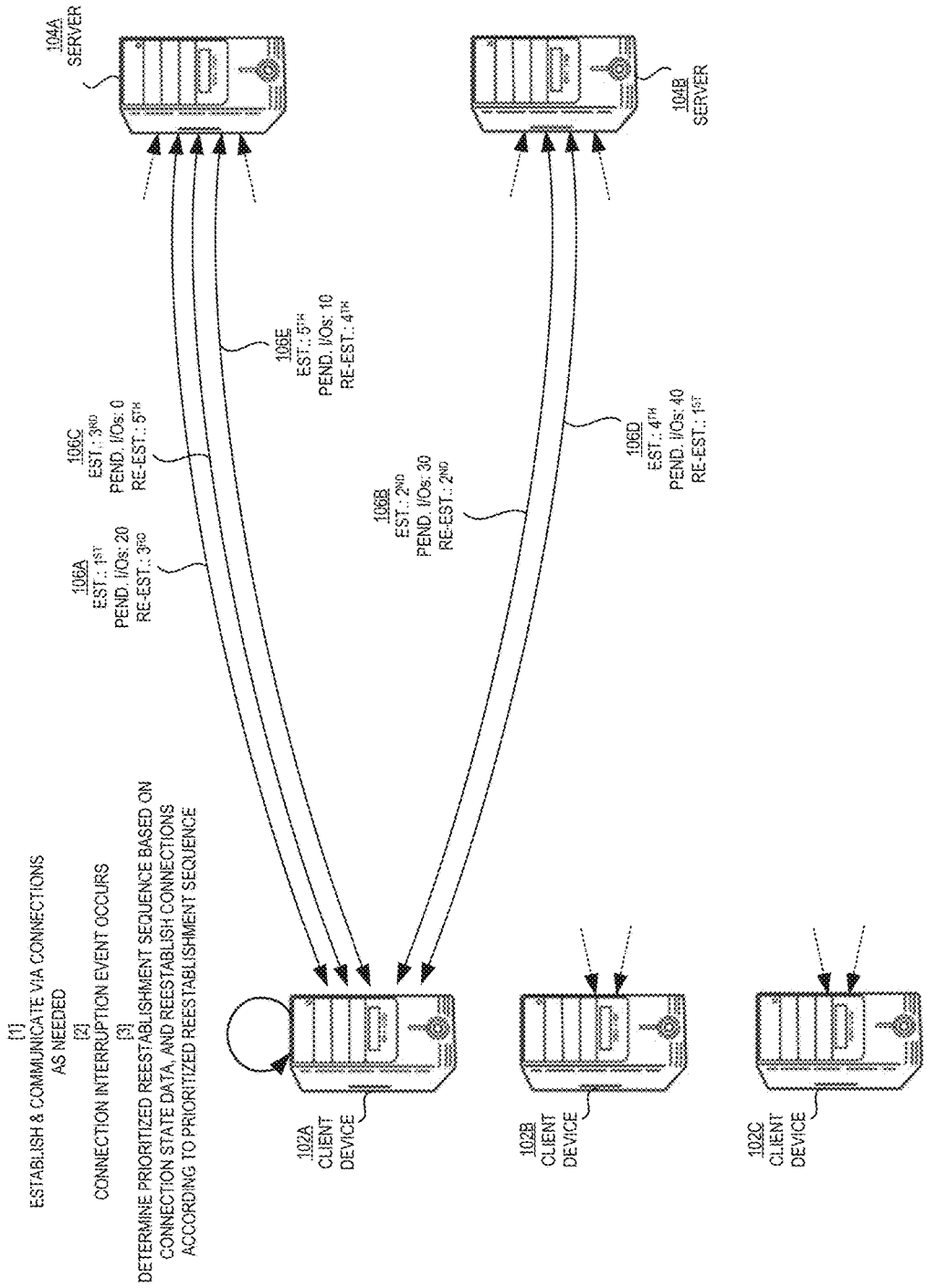
FIG. 1 is a block diagram depicting illustrative data flows and interactions between a client device and servers during a communication session in which multiple network connections are interrupted and restored according to some embodiments.

Generally described, the present disclosure relates to prioritized restoration of multiple network connections and sessions that have been interrupted. Computing systems utilize a communication network, or a series of communication networks, to exchange data. Such data is typically exchanged in network packets via network connections between a source system sending the packets and a destination system receiving the packets. Before such data can be exchanged, a connection is established between the source system and destination system. When the connection is interrupted, the connection is re-established before data exchange is resumed. When multiple connections are interrupted, the sequence in which they are reestablished can affect—in some cases significantly—the performance experienced over the connections. The performance may be defined in terms of latency, which is a measure of the communication delay between when a communication is initiated and when that communication is received, acknowledged, or the like.

As used herein, the terms "network connection" and "connection" are used according to their normal and customary meaning, and generally refer to any network link or combination of network links that may be used to connect various communication endpoints on a network to one another, for example, by using routers, switches, and gateways. Such a link may be established by using one or more network protocols. A network protocol is a set of rules that determine how data is transmitted within a network. For example, the connections described in the present disclosure may use network protocols such as, but not limited to, Transmission Control Protocol (TCP), User Datagram Protocol (UDP), and/or Scalable Reliable Datagram protocol (SRD).

As used herein, the term "session" is used according to its normal and customary meaning, and generally refers to any multi-way network connection enabling data exchange between two or more communication endpoints. Typically, a session includes one or more communications in each direction after establishment of the network connection over which the communications are sent. In the present disclosure, the terms "connection" and "session" may be used interchangeably to describe a network link between two particular endpoints. Although some examples will use a client device and a server as the two endpoints, the examples are not intended to be limiting or required. In some embodiments, connections and sessions may be established in other network architectures or between other types of endpoints, such as between two peer devices.

To establish a new network connection, a handshake is performed according to the appropriate protocol. Such a handshake is referred to herein as an "out-of-band" handshake due to occurrence of the handshake outside the context of a previously-established network connection. For example, if a connection is established using TCP, then a three-way TCP handshake may be performed during which a client device sends a SYN communication to a server, the server processes the SYN and responds with a SYN-ACK communication to the client device, and the client device processes the SYN-ACK and responds with an ACK communication to the server. The client device and server may then communicate with each other via the network connection.

A network connection may be interrupted due to, among other things, installation of an update to communication software such that any in-memory process executed by the communication software will be terminated. In conventional systems, when a network connection is interrupted, the connection is typically re-initialized via execution of another out-of-band handshake. Such an out-of-band handshake has a relatively high latency in comparison with the latency typically experienced during normal communication over the connection (e.g., normal delays attributable to latency inherent in the network infrastructure, typical network congestion, and the like). Thus, when the connection has been interrupted, executing the out-of-band handshake again to restore the connection can result in a significant delay in sending, receiving, or acknowledging pending communications, above and beyond the delay that would normally be expected. This effect can be compounded when an interruption event experienced by a computing system affects multiple connections that the computing system has established.

For example, a single computing system may establish and maintain a great number of network connections (e.g., dozens, hundreds, thousands, or more) with other computing systems at any given time, particularly in cloud computing environments, multi-user communication systems, and the like. The delay from reestablishing interrupted connections can be further compounded in environments in which computing systems, such as servers, host devices, and the like each establish multiple network connections and an event occurs causing network connection interruptions across a significant number of computing systems (e.g., an entire fleet of computing systems or a large subset thereof).

Some aspects of the present disclosure address the issues noted above, among others, by prioritizing the sequence according to which a computing system reestablishes network connections after an interruption event. When a computing system experiences a connection interruption event and multiple network connections are to be reestablished (e.g., when communication software is updated), the computing system can determine a prioritized sequence in which the network connections are to be reestablished so as to minimize the effect of the interruption event on the network connections. In some embodiments, a computing system that has experienced an interruption event may determine the reestablishment sequence based on connection state data associated with the network connections. For example, the computing system may determine the quantity of pending communications in queues for each of the connections that have been interrupted, and may determine a connection reestablishment sequence that prioritizes reestablishment of connections with greater quantities of pending communications over reestablishment of connections with lesser quantities of pending communications. As another example, the computing system may determine the total amount of data pending transmission for each of the network connections that have been interrupted, and may determine a connection reestablishment sequence that prioritizes reestablishment of connections with lesser amounts of data pending transmission over reestablishment of connections with greater amounts of data pending transmission. As a further example, a computing system may determine a type of data pending transmission for each of the network connections that have been interrupted, and may determine a connection reestablishment sequence that prioritizes reestablishment of connections with certain types of data over reestablishment of connections with other types of data.

In some embodiments, combinations of factors may be considered when determining a reestablishment sequence. Network connections may be associated with different performance parameters or other characteristics, such as network connections to endpoints with different rates at which communications are permitted or guaranteed to be processed (e.g., connections to remote data stores having a processing target of 3,000 I/O operations per second, 64,000 I/O operations per second, etc.). A computing system that has experienced an interruption event affecting multiple network connections may consider the performance parameter(s) of the connections in combination with other factors. For example, the computing system may determine the total quantity of pending communications or amount of data pending transmission for each network connection to be reestablished, as described above. The computing system may then weight each quantity using a value associated with a performance parameter of the corresponding connection, such as by multiplying the quantity of pending communications by a weighting factor associated with the target I/O operations per second of the data store to which the pending communications are to be sent. In this way, reestablishment of the connections can be prioritized such that the latency experienced by systems using each connection may be distributed in a manner that is aligned with the performance characteristics and current use of each connection, rather than being distributed according to the order in which the connections were originally established or in some other manner than is not aligned with expectations of users of the connections.

Additional aspects of the present disclosure relate to using an "in-band" handshake for more efficient restoration of each connection than experienced when re-executing an out-of-band handshake for each connection. The handshake is considered "in-band" in that the handshake occurs within the context of the previously-established network connection. In some embodiments, after a connection is initialized, connection metadata is persisted on the computing system. The connection metadata may include a connection identifier and/or other data fields necessary to identify the connection, such as a session identifier of the session for which the connection was established. The connection metadata may be stored, for example, in local persistent (or "p-state") memory which is unchanged when the connection is disrupted. In some embodiments, when a connection disruption is anticipated (e.g., when a real-time or "live" update is pushed to communication software, an application, or some other software component on the client device), the connection metadata may be stored just before the connection is interrupted. Subsequently, when the connection disruption is over (e.g., when the update is completed and the updated software begins executing again), the connection may be restored from the persisted metadata. Advantageously, communication may resume over the connection without re-executing an out-of-band handshake, such as a TCP handshake. For example, a client device may resume communicating with a server using connection metadata for a previously-initiated connection. In some embodiments, to notify the server that the connection is being resumed in this way, the client device may initiate an in-band handshake by sending a network packet containing the connection metadata or a portion thereof to the server, notifying the server that the connection has been reset. The client device and server may then proceed to communicate via the restored connection without significant downtime.

Various aspects of the disclosure will be described with regard to certain examples and embodiments, which are intended to illustrate but not limit the disclosure. Although aspects of some embodiments described in the disclosure will focus, for the purpose of illustration, on particular examples of network connections, client devices, computer memory, and server systems, the examples are illustrative only and are not intended to be limiting. In some embodiments, the techniques described herein may be applied to additional or alternative network restoration systems and methods. Additionally, any feature used in any embodiment described herein may be used in any combination with any other feature or in any other embodiment, without limitation.

Example Network Environment

FIG. 1 is a block diagram of an illustrative network environment depicting data flows and interactions between client devices 102A, 102B, 102C, 102D and servers 104A, 104B through various network connections according to some embodiments.

The network connections may be established over network infrastructure of a communication network (not shown). In some embodiments, the communication network (also referred to simply as a "network") may be a publiclyaccessible network of linked networks, possibly operated by various distinct parties, such as the Internet. In some cases, the network may be or include a private network, personal area network, local area network, wide area network, global area network, cable network, satellite network, cellular data network, etc., or a combination thereof, some or all of which may or may not have access to and/or from the Internet.

Client devices 102A-102D may be or include any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. In some embodiments, a client device may be a host computing device comprising computing hardware configured to provide computing resources to customers. For example, the computing resources may be or include compute resources (e.g., execution of virtual machines, application software, and the like), storage resources (e.g., database storage, volume storage), other computing resources, or some combination thereof.

Servers 104A, 104B (or individual components thereof) may be implemented on one or more physical server computing devices. In some embodiments, a server (or individual components thereof) may be implemented on one or more host devices, such as blade servers, midrange computing devices, mainframe computers, desktop computers, or any other computing device configured to provide computing services and resources. In some embodiments, the features and services provided by a server may be implemented as web services consumable via one or more communication networks, such as local area networks, intranets, and/or the internet. In further embodiments, a server (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The description that follows will focus on example connections between a particular client device 102A and servers 104A, 104B. However, the description and examples are for purposes of illustration only, and are not intended to be limiting, required, or exhaustive. In some embodiments, the same or similar operations may be performed with respect to connections established between other client devices 102B-102D and servers 104A, 104B, connections between and among client devices 102A-102D, connections between and among servers 104A, 104B, connections between and among internet of things (IOT) devices and local coordinator devices, connections between and among IOT devices and remove servers, connections between and among IOT devices and other IOT devices, etc. For example, a coordinator device or server may have connections with dozens, hundreds, or more different IOT devices, and the coordinator device or server may experience an interruption event that inters some or all of the connections.

With reference to the illustrative embodiment shown in FIG. 1, at [1] client device 102A may establish connections with servers 104A-104B and communicate with the servers over the established connections. The initial establishment of the connections may be accomplished by executing an out-of-band handshake for each of the connections, according the protocol for each connection. The connections may be established using the same or different protocols. For example, a single client device 102A may establish different connections using different protocols to the same or different servers 104A, 104B.

A client device may establish any number of connections with a given server. Illustratively, client device 102A may establish connections 106A, 106C, and 106E with server 104A. Client device 102A may also establish connections 106B and 106D with server 104B. Client device 102A may establish multiple connections with a given server or network connections with multiple different servers for any of a wide variety of reasons. In one example, servers 104A and 104B are part of a virtualized data storage and access system that presents data storage services via virtualization layers such that data appears to client devices 102A-102D as though it resides locally in data stores of the client devices 102A-102D (e.g., local data volumes) even though the data is hosted remotely across a network. A virtualized storage communication layer on a client device 102A may manage input-output requests and other communications by queueing the communications and relaying them to the servers 104A, 104B over corresponding network connections. If the client device 102A accesses multiple data stores that are remotely hosted by one server (e.g., server 104A), then the virtualization layer of the client device 102A may establish multiple connections to the server 104A: one connection for each remotely-hosted volume or other data store. If the client device 102A accesses different data stores remotely hosted by different servers (e.g., one or more data volumes on server 104A, one or more data volumes on server 104B), then the virtualization layer of the client device 102A may establish a corresponding number of separate connections to the respective servers 104A, 104B.

As shown, client device 102A may establish the connections in a particular order: 106A first, 106B second, 106C third, 106D fourth, and 106E fifth. The connections may be established substantially consecutively (e.g., once connection 106A is established, then establishment of connection 106B is initiated without a substantial period of time or number of operations being performed in between), or as needed (e.g., connection 106A is established, client device 102A performs various operations that may or may not include communication over connection 106A, then connection 106B may be established when it will be needed, and so on). Once the connections 106A-106E are established, the client device 102A may use the connections as needed to communicate with servers 104A, 104B.

At [2], client device 102A may determine that an interruption event has occurred to interrupt one, several, or all of connections 106A-106E. The client device 102A may detect the interruption event itself, or that one or more connections have been interrupted. For example, the interruption event may be the installation of a software upgrade to communication software used to manage one or more connections. The client device 102A may receive the software update to be installed, receive a notification to install the update, or the like. The software update event may be a known interruption event, and the client device 102A may proceed with the software update to be followed by a prioritized connection restoration routine. As another example, installation of a software upgrade may not be an interruption event known to the client device 102A, but the client device 102A may detect that the connections have been interrupted once the software upgrade begins or at some time after the software upgrade is completed.

Figure 3:
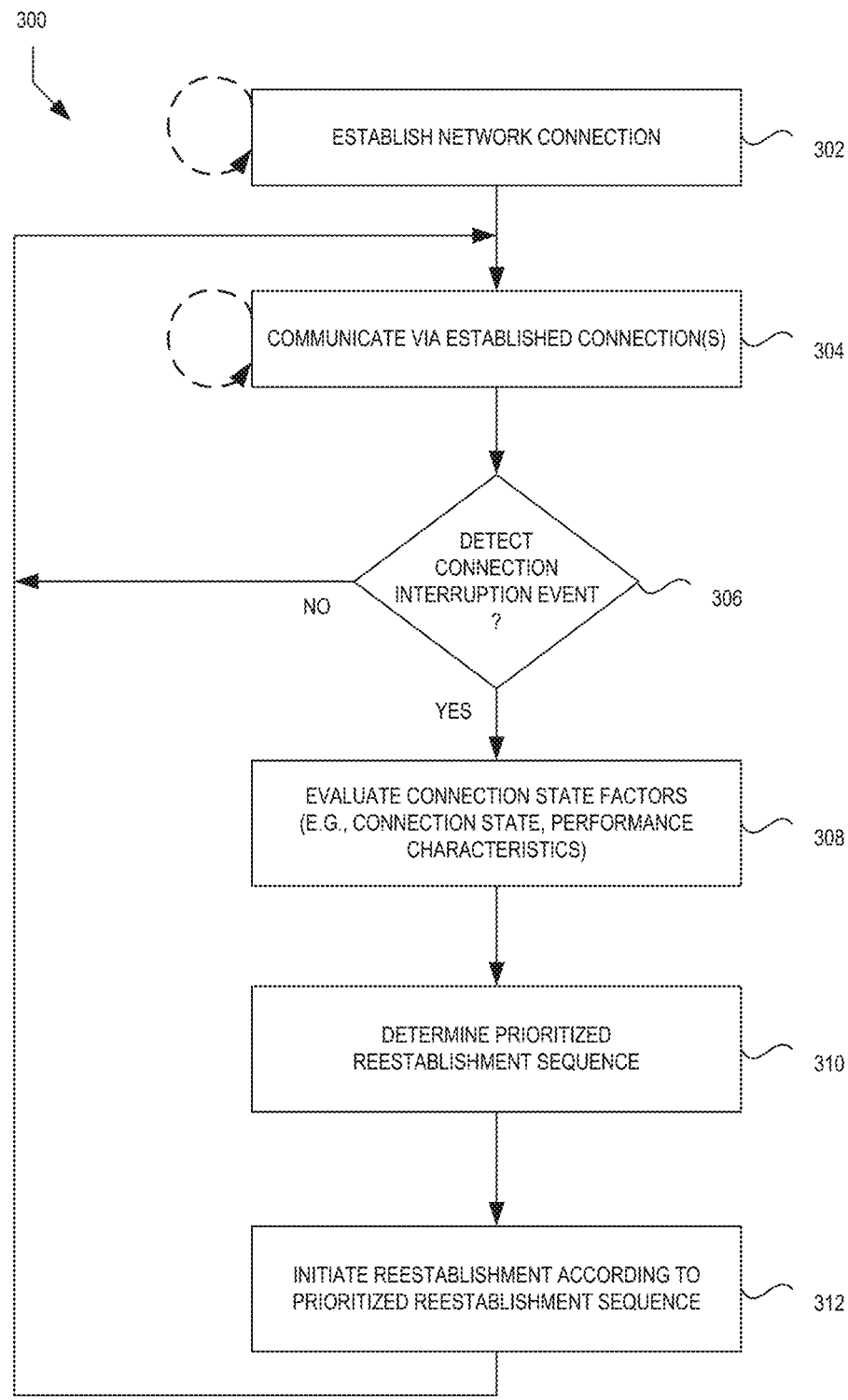
FIG. 3 is a flow diagram of an example routine for prioritized restoration of multiple connections by a computing system according to some embodiments.

At [3], the client device 102A may initiate a prioritized connection restoration routine. Advantageously, the prioritized connection restoration routine may be performed to intelligently establish interrupted network connections based on the context in which the network connections were being used when interrupted (e.g., number of pending communications queued to be sent, amount of data queued to be sent, type of data queued to be sent, etc.), performance parameters of the network connections (e.g., input/output operations per second or "IOPS" handled by a computing system on the other end of a connection), other factors, or some combination thereof. In this way, the connections may be established to reduce perceived latency in comparison with other techniques, such as reestablishment of connections in the same order in which they were originally established. A detailed example of a prioritized connection restoration routine is shown in FIG. 3 and described in greater detail below.

In the example shown in FIG. 1, the connections may be reestablished based on the quantity of pending communications in the queue for each connection. Connection 106A has 20 pending communications, connection 106B has 30 pending communications, connection 106C has 0 pending communications, connection 106D has pending communications, and connection 106E has 10 pending communications. Connections with greater quantities of pending communications may be prioritized over connections with lesser quantities of pending communications. Thus, connection 106D may be reestablished first, connection 106B may be reestablished second, connection 106A may be reestablished third, connection 106E may be reestablished fourth, and connection 106C may be reestablished fifth.

Efficient Reestablishment of a Connection

Figure 2:
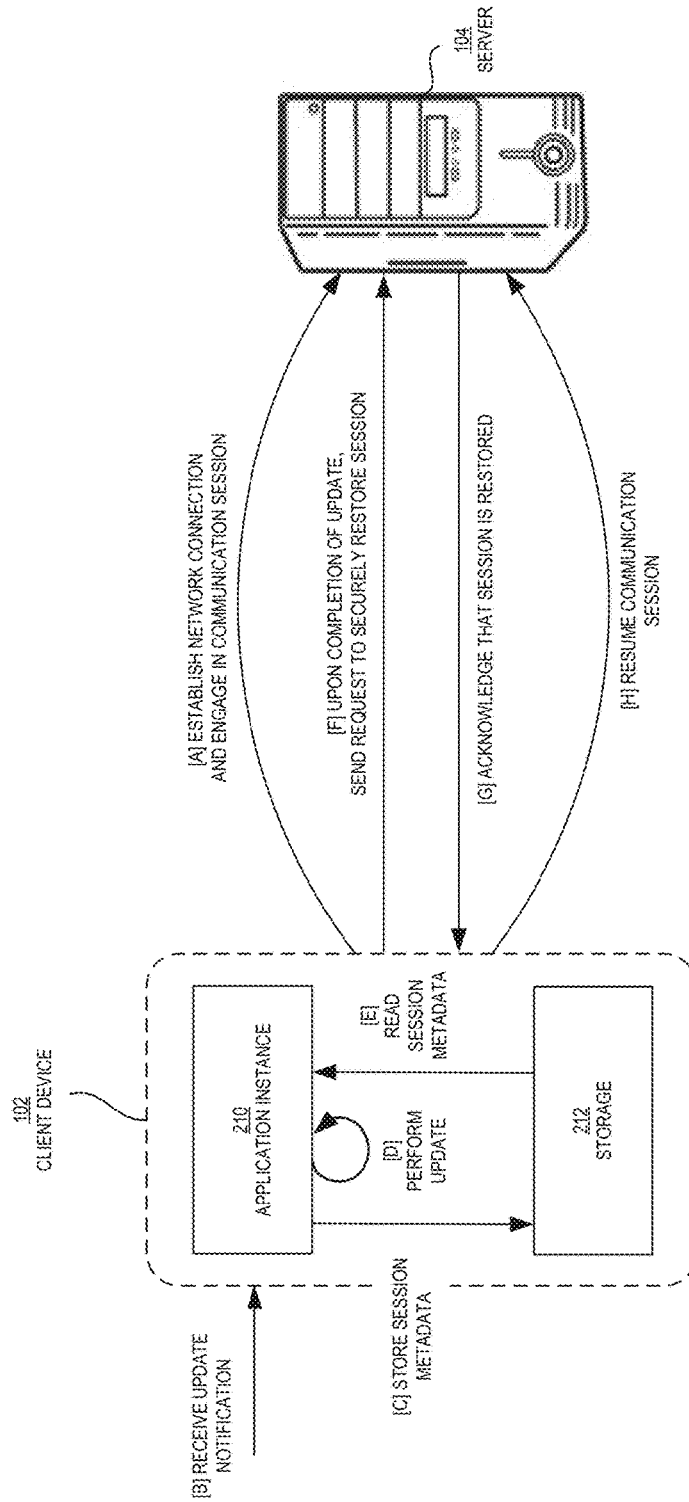
FIG. 2 is a block diagram depicting illustrative data flows and interactions between a client device and a server during a communication session in which an update occurs and a network connection is restored according to some embodiments.

FIG. 2 illustrates operations and interactions that may be implemented to efficiently reestablish a particular connection using an "in-band" handshake after an interruption event occurs and a network connection is restored. For clarity and ease of explanation, only a single connection is illustrated and described as being established and reestablished; however, the same or similar operations may be performed for each other connection that is reestablished as part of a prioritized connection restoration routine like the one described above and in greater detail below. The example operations and interactions for reestablishing a single connection shown in FIG. 2 and described herein are illustrative only, and are not intended to be limiting, required, or exhaustive. In some embodiments, any or all connections reestablished according to a prioritized sequence may be reestablished without using the operations and interactions shown in FIG. 2.

In some embodiments, as shown, a client device 102 may communicate with a server 104 via an executable application instance 210 (e.g., a "headless" data processing application, and interactive application such as a web browser, etc.). The application instance 210 may obtain data from the server 104, from the client device's local storage, or from other sources. In some cases, the application instance 210 may also or alternatively generate data. The application instance 210 may communicate data to the server 104 for storage, further processing, or the like.

In addition to various other computing components not shown for ease of illustration (e.g., processors, volatile memory, user interfaces, and the like), the client device 102 may have storage 212. For example, storage may be located physically within a housing of the client device 102 such as on a processor chip, in a basic input-output system (BIOS) chip, or the like. In some cases, the storage 212 may be coupled to, integrated with, or otherwise accessible to a network interface, such as an external network interface card that is coupled to the client device 102 via a cable, card interface, or the like. The storage 212, may be used to store network communication session metadata for use in swiftly restoring network connections as described herein. In one specific non-limiting embodiment, the storage 212 may be persistent memory, also referred to as "p state" memory.

At [A], the client device 102 establishes a network connection and engages in a communication session with the server 104. In some embodiments, the network connection and communication session may be established in order to facilitate communications between the client device 102 and server 104 for the purpose of running an application instance 210 on the client device 102. The session may proceed with various input or output communications (e.g., I/O requests) sent from the client device 102 to the server 104. For example, the I/O requests may include data read or data write requests sent to the server 104. The server 104 may respond to data read requests by providing the requested data. The server 104 may respond to data write requests by acknowledging receipt of the data to be written and/or successful write of the data.

At [B], the client device 102 may receive a notification to initiate an update. The update may be a process used to update application software on the client device 102 immediately or substantially immediately. For example, the update may include a software update and deployment to the executable application software that supports the application instance 210, such as application software that is managing or otherwise using the established network connection. Thus, the update may disrupt communications between the client device 102 and server 104 such that the network connection and communication session established at [A] is discontinued.

At [C], in response to receiving the update, and before the update initiates, the client device 102 may store communication session metadata from the application instance 210 to local storage 212. In some embodiments, the session metadata may comprise a network connection identifier, a network or session connection key, a server identifier associated with the server 104, a port number, other information, or some combination thereof. The session metadata includes at least sufficient information to identify the connection initially established between the client device 102 and server 104 at [A]. In some embodiments, the session metadata may always be stored in local persistent storage (e.g., even before an update has initiated); in these embodiments, at [C], the client device 102 checks to ensure that the stored session metadata is up to date. In some embodiments, the local storage 212 in which the session metadata is stored is internal to the client device 102 (e.g., random access memory or read-only memory). In other embodiments, the storage 212 may be external to the client device 102, such as an attachable network card or other attachable device. As used herein, the term "persistent" refers to the fact that the storage 212 is persisted even if the application instance 210 is interrupted or terminated, and is not meant to denote that the session metadata must be stored in substantially permanent storage (e.g., on a hard disk).

At [D], the update may be performed on the client device 102. As mentioned above, during the update, the network connection and communication session are interrupted. In some embodiments, due to the subsequent reestablishment using an in-band handshake, there is no indication that an update is being performed on the client device 102, other than increased latency in interactions between the client device 102 and server 106. For example, the application instance 210 may continue operating substantially as expected without receiving notification that the update is being or has been performed, that the network connection is being or has been interrupted, that the network connection is being or has been reconnected, etc.

At [E], upon completion of the update, the client device 102 can read the previously stored session metadata from storage 212. Then, at [F], the client device 102 can send to the server 104 a request to restore the network connection and communication session. The request may be referred to as a reestablishment communication. The request may be an in-band request that is sent to the server 104 based on stored session metadata, rather than a handshake for a new connection. In some embodiments, the request includes at least a portion of the previously stored session metadata and serves as a signal to the server 104 to resume communications through the previously established network connection and communication session. In some embodiments, the request may be packaged along with other data input/output requests. Beneficially, by persisting the connection and session metadata and restoring the connection through an in-band request, downtime due to the update may be reduced significantly. Specifically, the in-band request avoids the time it takes to setup and perform an out-of-band handshake (e.g., a TCP request and acknowledgement) for connections across the network.

In some embodiments, in response to receiving the request to restore the session, the server 104 may initiate a clean-up procedure on the session. Beneficially, this can help mitigate or avoid issues with duplicate input/output requests sent by the client device 102, because the client device 102 may be, for example, configured to re-send (or "re-play") previously-sent I/O requests for which the client device 102 has not received an acknowledgement from the server 104.

At [G], the server 104 can send an acknowledgement to the client device 102 that the communication session has been restored and that the communications may resume using that session. At [H], as described above, the client device 102 may re-send any unacknowledged I/O requests, thus resolving any possible issues from restoring the session. At this point, the client device 102 and server 104 may resume normal interactions through the restored session.

Example Prioritized Connection Restoration Routine

FIG. 3 is a flow diagram of an example routine 300 performed by a computing system that has caused or otherwise experienced an interruption event affecting multiple network connections. The routine 300 will be described with further reference to the examples illustrated in FIGS. 4A and 4B.

In some embodiments, the routine 300 may begin in response to an event, such as when a computing system capable of establishing multiple network connections begins operation. When the routine is initiated, one or more processors may perform operations based on instructions of an executable application in memory (e.g., random access memory or "RAM") of the computing system. In some embodiments, the routine or portions thereof may be implemented on multiple processors, serially or in parallel.

Although the routine 300 will be described herein as being executed by certain computing systems (e.g., user device, server), in the context of network connections established for certain applications (e.g., virtualized storage volumes, group communications) and reestablished in response to certain connection interruption events (e.g., software updates, reboots), the examples are illustrative only and are not intended to be limiting, required, or exhaustive. In some embodiments, some or all operations of routine 300 may be performed by other types of computing systems, for other network communication applications, in response to other types of interruption events, or the like.

At block 302, the computing system executing routine 300—a client device 102 in this example—may establish a connection with another computing system—a server 104 in this example. In some embodiments, the connection may be established to initiate a client session (also referred to herein as a "communication session"), wherein the client session relates to interactions between an executable application on the client device 102 and a server 104.

At block 304, the client device 102 (or other computing system executing routine 300) can use any established connections to communicate with server(s) (or other computing system(s)) as needed according to the particular application for which each network connection was established.

As shown by the self-loops from/to blocks 302 and 304 in FIG. 3, these blocks may be repeated any number of times by the client device 102, any time a new connection is needed or desired, or any time a communication via the network connection is needed or desired.

Figure 4A:
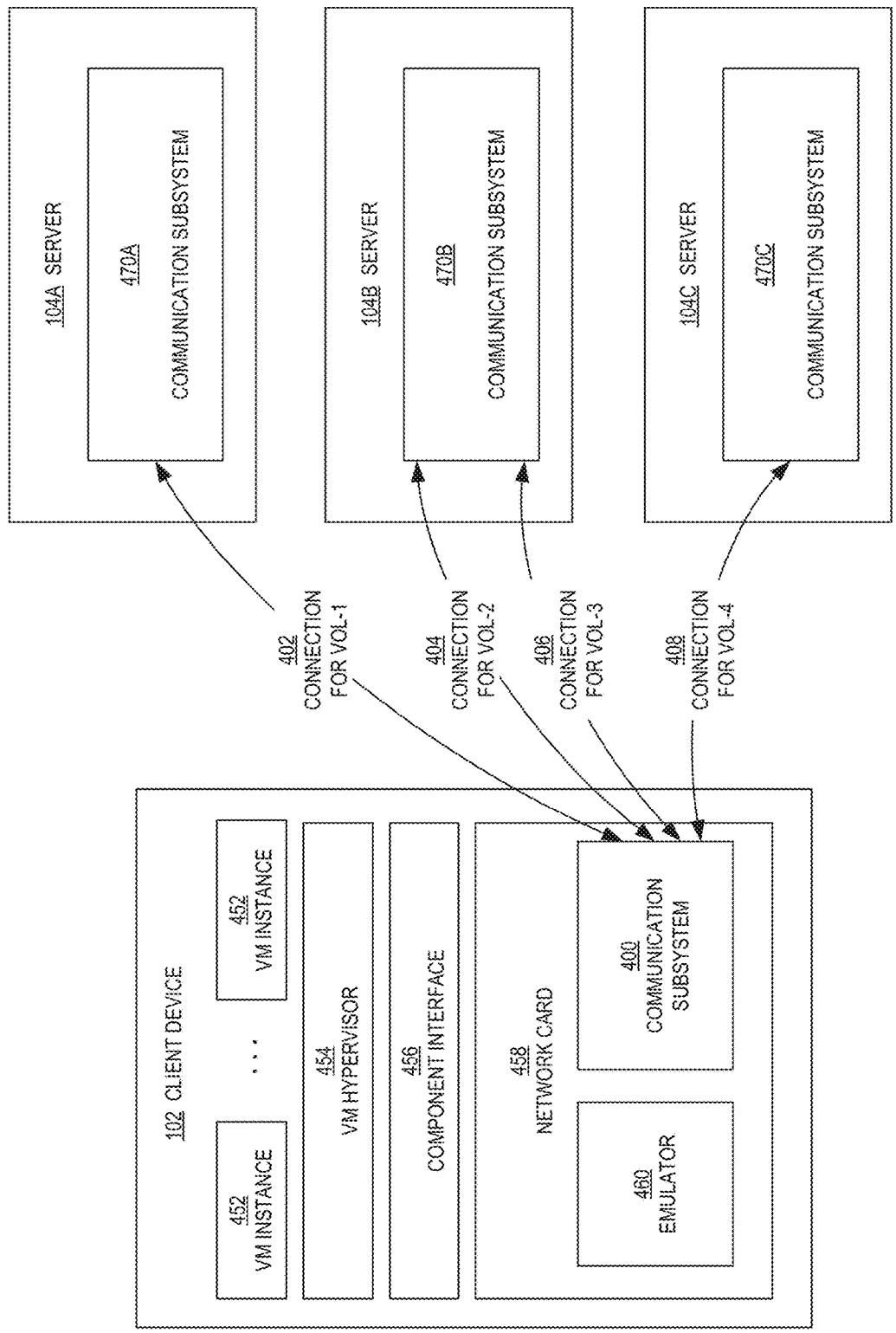
FIG. 4A is a block diagram depicting an illustrative client device with connections to various servers according to some embodiments.

FIG. 4A is a block diagram depicting an example implementation of a computing resource provider system in which connections may be established and prioritized connection restoration may be implemented. The computing resources may include virtual machines executing on a host device, such as a client device 102. Users may operate a client device 102 to access the information of and/or to generate information for storage on servers, for example via one or more virtual machine ("VM") instances. As another example, the computing resources may also or alternatively include data storage services for virtual machines, such as block storage for storage volumes that may be virtually attached to VM instances and accessed as though data is residing on a hard disk, solid state disk, or other physical volume of a client device 102.

As illustrated, a client device 102 may communicate with multiple servers 104A, 104B, and 104C to access computing resources provided by the severs 104A, 104B, and 104C or to utilize computing resources of the client device 102. For example, the client device 102 may comprise one or more VM instances 452. In some embodiments, a VM instance 452 may be a "headless" instance in which there is not an interactive user interface presented to a user, but rather application software that is executing on a schedule, on request, or in response to an event. In some embodiments, a VM instance 452 may include a graphical user interface through which a user of the client device 102 may interact with and manipulate application data stored on the servers 104A, 104B, and 104C.

The one or more VM instances 452 may be supported by a VM hypervisor 454 (also commonly referred to as a virtual machine monitor or "VMM"). The VM hypervisor 454 is software that enables creating and running one or more virtual machines on a host device, such as a client device 102.

The client device 102 may further include a component interface 456, which allows for interfacing internal and/or external devices (e.g., a network card 458) with the client device 102. In various embodiments, the component interface 456 may include various types of USB standard ports, one or more PCIe standard ports, serial ports, parallel ports, PS/2 ports, VGA ports, FireWire ports, and/or infrared ports, or some combination thereof.

The client device 102 may further include a network card 458 integrated with, coupled to, or otherwise in communication with the client device 102 via the component interface 456. In the illustrated example, the network card 458 provides the architecture necessary for the client device 102 to communicate with a server. For example, the network card 458 may include an emulator 460, which enables the client device 102 to emulate a remote virtual machine. In various implementations, the emulator 460 may include various different VM emulators, such as, but not limited to, VMWare, VirtualBox, Parallels, QEMU, uEMU, Eucalyptus, and/or EmuVM.

The network card 458 may also include a client-side transportation layer, such as a communication subsystem 400, which manages communications between the client device 102 and servers 104A, 104B, and 104C. In some embodiments, the communication subsystem 400 may include instructions for communicating via various network communication protocols, such as SRD protocol or UDP protocol, among others.

A server 104A, 104B, or 104C may also include a server-side transportation layer, such as a communication subsystem 470A, 470B, or 470C, respectively, which manages communications to and from the client device 102 (and other client devices). In some embodiments, the communication subsystems 470A, 470B, or 470C may similarly include instructions for communicating via various network communication protocols, such as SRD protocol or UDP protocol.

The illustrated protocols are for purposes of example only, and are not intended to be limiting, required, or exhaustive of the network communication protocols with which swift connection restoration techniques may be used. In some embodiments, other protocols may be used, such as TCP/IP.

A connection between the client device 102 and a server may be established between the respective transportation layers. For example, as illustrated in FIG. 4A, connection 402 may be established between communication subsystem 400 of the client device 102 and communication subsystem 470A of server 104A. Connections 404 and 406 may be established between communication subsystem 400 of the client device 102 and communication subsystem 470B of server 104B. Connection 408 may be established between communication subsystem 400 of the client device 102 and communication subsystem 470C of server 104C. Note that even though multiple network connections are established and used, the communication subsystem 400 may in some embodiments include or manage only a single physical network interface card ("NIC") and therefore there may only be a single network cable over which data is transmitted for each of the multiple logically independent connections.

Figure 4B:
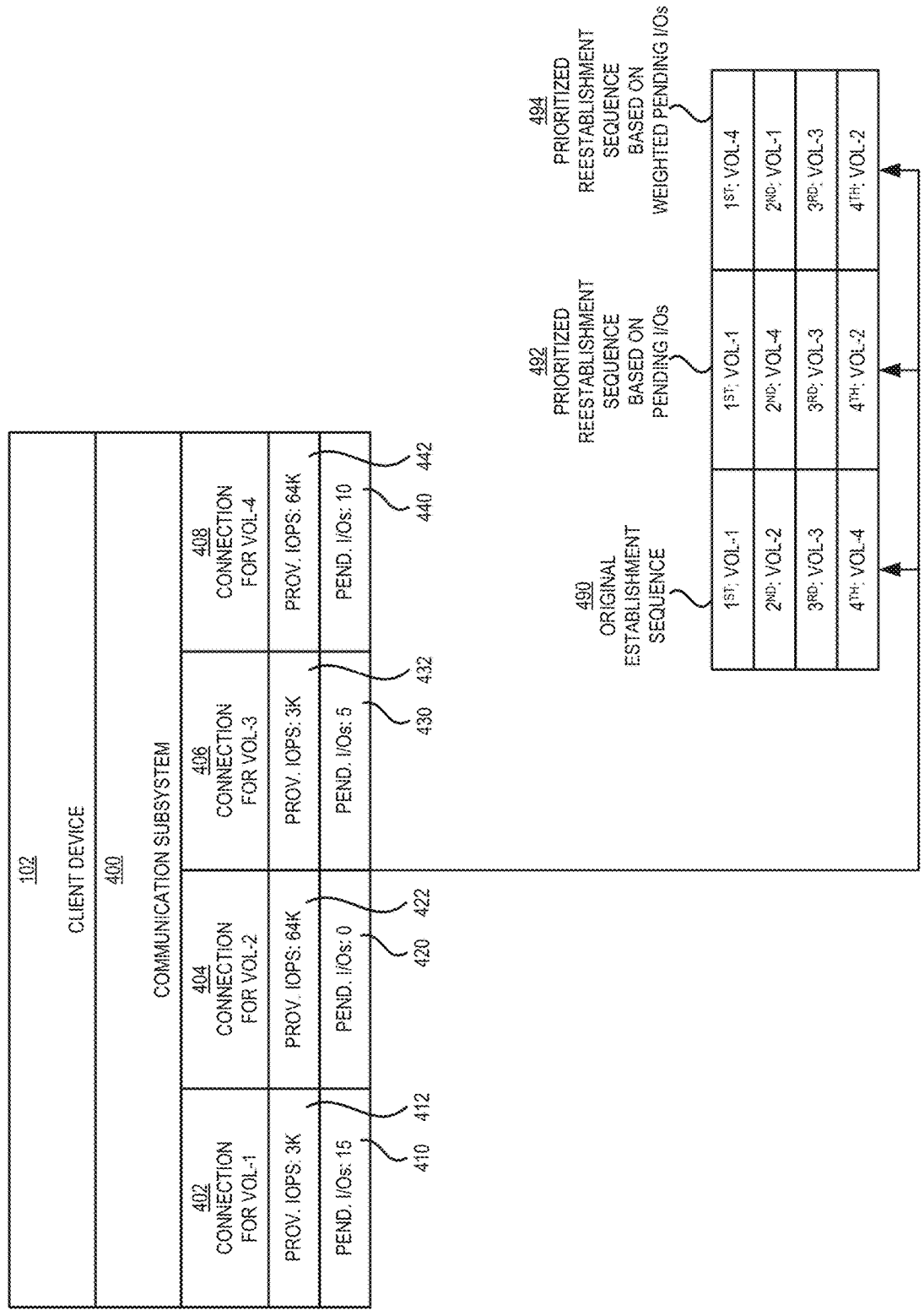
FIG. 4B is a block diagram depicting prioritized restoration of multiple connections based on connection state factors including a quantity of pending communications queued for each connection according to some embodiments.

FIG. 4B shows client device 102 using the established network connections 402, 404, 406, and 408 for accessing and interacting with data stores (e.g., block storage volumes) hosted remotely on servers 104A, 104B, and 104C. Each connection may be represented by various data items, such as connection state data, performance data, etc. For example, a first connection 402 established to access data associated with a particular block storage volume ("VOL-1") may be represented by connection state data 410 and connection performance data 412, a second connection 404 established to access data associated with a second volume ("VOL-2") may be represented by connection state data 420 and connection performance data 422, a third connection 406 established to access data associated with a third volume ("VOL-3") may be represented by connection state data 430 and connection performance data 432, and a fourth connection 408 established to access data associated with a fourth volume ("VOL-4") may be represented by connection state data 440 and connection performance data 442.

Returning to FIG. 3, at block 306 the client device 102 (or other computing system executing the routine 300) can detect a connection interruption event. Depending upon the implementation of the routine 300 or the context in which an interruption event occurs, the client device 102 may detect the interruption event itself, or that one or more connections have been interrupted.

In some embodiments, the interruption event may be an event that the client device 102 or a subsystem thereof (e.g., a communication management component) is configured to detect. For example, the interruption event may be installation of a software upgrade to communication software used to manage one or more connections. As another example, the interruption event may be a reboot of the client device 102 or restart of a virtual machine instance or other component of the client device 102. In general, any event that may be known to cause interruption of network connections may be detected, either in advance of occurrence of the interruption event or after the interruption event has occurred.

In some embodiments, a subsystem of the client device 102 may be notified that an interruption event will occur or has occurred. For example, an operating system, hypervisor, or other management component of the client device may notify a communication management component that an interruption event has occurred or will occur. As another example, software update configuration data provided with a software update to be installed on the client device 102 may include a flag indicating whether installation of the software update will result in an interruption event.

In some embodiments, the client device 102 may detect the interruption event itself, or that one or more connections have been interrupted. For example, when a communication is to be sent over a particular connection, the client device 102 or a subsystem thereof (e.g., communication subsystem 400) may determine that the connection—and one or more additional connections—have been interrupted.

At block 308, the client device 102 (or other computing system executing the routine 300) can evaluate, for each connection to be reestablished, data regarding one or more factors to be considered in determining a prioritized sequence of reestablishment. The data may include: connection state data, connection performance data, other data associated with the connection, or some combination thereof.

In some embodiments, connection state data for a given connection may represent one or more properties of the connection in the context in which the connection is being used or was being used when it was interrupted. For example, connection state data may represent a quantity of communications (e.g., I/O requests) pending transmission via the connection. The communications may in a queue associated with the connection. Such communications may be referred to as "pending I/O requests" or more generally referred to as "pending communications." As another example, connection state data may represent an amount of data (e.g., measured in bits or bytes) pending transmission via the connection. The data may be in the form of pending communications in a queue associated with the connection. As a further example, connection state data may represent the type or types of data (e.g., audio data, image data, text data, block storage data, binary object data, etc.) pending transmission via the connection. The data may be in the form of pending communications in a queue associated with the connection. Different types of data may be associated with different presentation modalities or other processing characteristics. Connection state data may include values for any of these properties, other properties, or some combination thereof.

In some embodiments, connection performance data for a given connection may represent one or more performance parameters of the connection or performance parameters of an endpoint associated with the connection. For example, if a connection is established to a remotely-hosted storage volume, the volume may guarantee or target a particular rate at which I/O requests may are to be processed, also known as "provisioned IOPS" (e.g., 3,000 IOPS, 64,000 IOPS, etc.). As another example, the connection may have a maximum transmission unit or "MTU" that specifies the largest size of a frame or packet permitted to be sent over the connection (e.g., 1,500 bytes, 4,000 bytes, 9,000 bytes, etc.). As a further example, the connection may be assigned a particular bandwidth, such as when bandwidth throttling is implemented for connections multiplexed over a single physical cable (e.g., 1 gigabit per second, 10 gigabits per second, etc.). Connection performance data may include values for any of these performance parameters, other performance parameters, or some combination thereof.

In the example illustrated in FIG. 4B, the first connection 402 that has been established for communications with a particular remotely-hosted block storage volume ("VOL-1") is associated with a queue in which there are pending communications to be sent. This is represented by connection state data 410 indicating a quantity of fifteen (15) pending communications. The volume has a target communication processing rate of 3,000 IOPS. Thus, connection performance data 412 for the connection indicates 3,000 provisioned IOPS.

The second connection 404 that has been established for communications with a different remotely-hosted block storage volume ("VOL-2") is associated with a queue in which there are no pending communications to be sent. This is represented by connection state data 420 indicating a quantity of zero (0) pending communications. The volume has a target communication processing rate of 64,000 IOPS. Thus, connection performance data 422 for the connection indicates 64,000 provisioned IOPS.

The third connection 406 that has been established for communications with another remotely-hosted block storage volume ("VOL-3") is associated with a queue in which there are pending communications to be sent. This is represented by connection state data 430 indicating a quantity of five (5) pending communications. The volume has a target communication processing rate of 3,000 IOPS. Thus, connection performance data 432 for the connection indicates 3,000 provisioned IOPS.

The fourth connection 408 that has been established for communications with yet another remotely-hosted block storage volume ("VOL-4") is associated with a queue in which there are pending communications to be sent. This is represented by connection state data 440 indicating a quantity of ten (10) pending communications. The volume has a target communication processing rate of 64,000 IOPS. Thus, connection performance data 442 for the connection indicates 64,000 provisioned IOPS.

At block 310, the client device 102 (or other computing system executing routine 300) can determine a reestablishment sequence according to which multiple network connections are to be reestablished. The reestablishment sequence may be prioritized based on various properties of the connections to be reestablished, such as those represented by connection state data, connection performance data, other data associated with the connections, or some combination thereof.

FIG. 4B illustrates some example reestablishment sequences for reestablishing the four connections after an interruption event. For comparison purposes, a first reestablishment sequence 490 is shown that is not prioritized based on state or performance of the connections, but rather is based solely on the original sequence in which the connections were established. According to the first reestablishment sequence 490, the connection for VOL-1 is to be reestablished first, the connection for VOL-2 is to be reestablished second, the connection for VOL-3 is to be reestablished third, the connection for VOL-1 is to be reestablished last. In this scenario, the connection with pending communications and a high degree of provisioned IOPS—the connection for VOL-4—is to be reestablished last, after connections with lower degrees of provisioned IOPS and even after one connection with no pending communications.

A second reestablishment sequence 492 is shown that is prioritized based on connection state data associated with the connections, and specifically based on the quantity of pending communications for each connection where connections with greater quantities of pending communications are to be reestablished prior to reestablishment of connections with lesser quantities of pending communications. Thus, the second reestablishment sequence 492 may be referred to as a prioritized reestablishment sequence. In this example in which reestablishment of the connections is prioritized based on the quantity of pending communications for each connection, the values by which the connections are sorted to determine the reestablishment sequence would be 15 for the connection for VOL-1, 0 for the connection for VOL-2, 5 for the connection for VOL-3, and 10 for the connection for VOL-4. Accordingly, in the second reestablishment sequence 492, the connection for VOL-1 is to be reestablished first, the connection for VOL-4 is to be reestablished second, the connection for VOL-3 is to be reestablished third, the connection for VOL-2 is to be reestablished last.

A third reestablishment sequence 494 is shown that is prioritized based on a combination of connection state data and connection performance data associated with the connections, and specifically by weighting the quantity of pending communications for each connection based on the provisioned IOPS for the volumes with which the connections are associated. Thus, the third reestablishment sequence 494 may also be referred to as a prioritized reestablishment sequence. In some embodiments, the IOPS value itself may be used as the weighting factor. For example, a weight of 3,000 or 64,000 may be used for connections to volumes having provisioned IOPS of 3,000 or 64,000, respectively. As another example, the weighting factor may be derived from the IOPS value such that the increase in weight value per increase in IOPS may not be linear, but may instead be logarithmic, exponential, etc.

In an example in which the weight value=provisioned IOPS value for each connection, the calculated values by which the connections are sorted to determine the reestablishment sequence would be 45,000 for the connection for VOL-1, 0 for the connection for VOL-2, 15,000 for the connection for VOL-3, and 640,000 for the connection for VOL-4. Accordingly, in the third reestablishment sequence 494, the connection for VOL-4 is to be reestablished first, the connection for VOL-1 is to be reestablished second, the connection for VOL-3 is to be reestablished third, the connection for VOL-2 is to be reestablished last.

The example data items, combinations, and calculations described herein for determining a reestablishment sequence are illustrative only, and are not intended to be limiting, required, or exhaustive. In some embodiments, additional, fewer, or alternative data items, combinations, or calculations may be used.

At block 312, the client device 102 (or other computing system executing routine 300) can initiate prioritized reestablishment of multiple network connections according to the prioritized reestablishment sequence. In some embodiments, each network connection may be reestablished using an in-band handshake as described in greater detail above. In some embodiments, each network connection may be reestablished using an out-of-band handshake. In some embodiments, one or more network connections may be reestablished using in-band handshakes and one or more network connections may be reestablished using out-of-band handshakes.

Additional Embodiments

Figure 5:
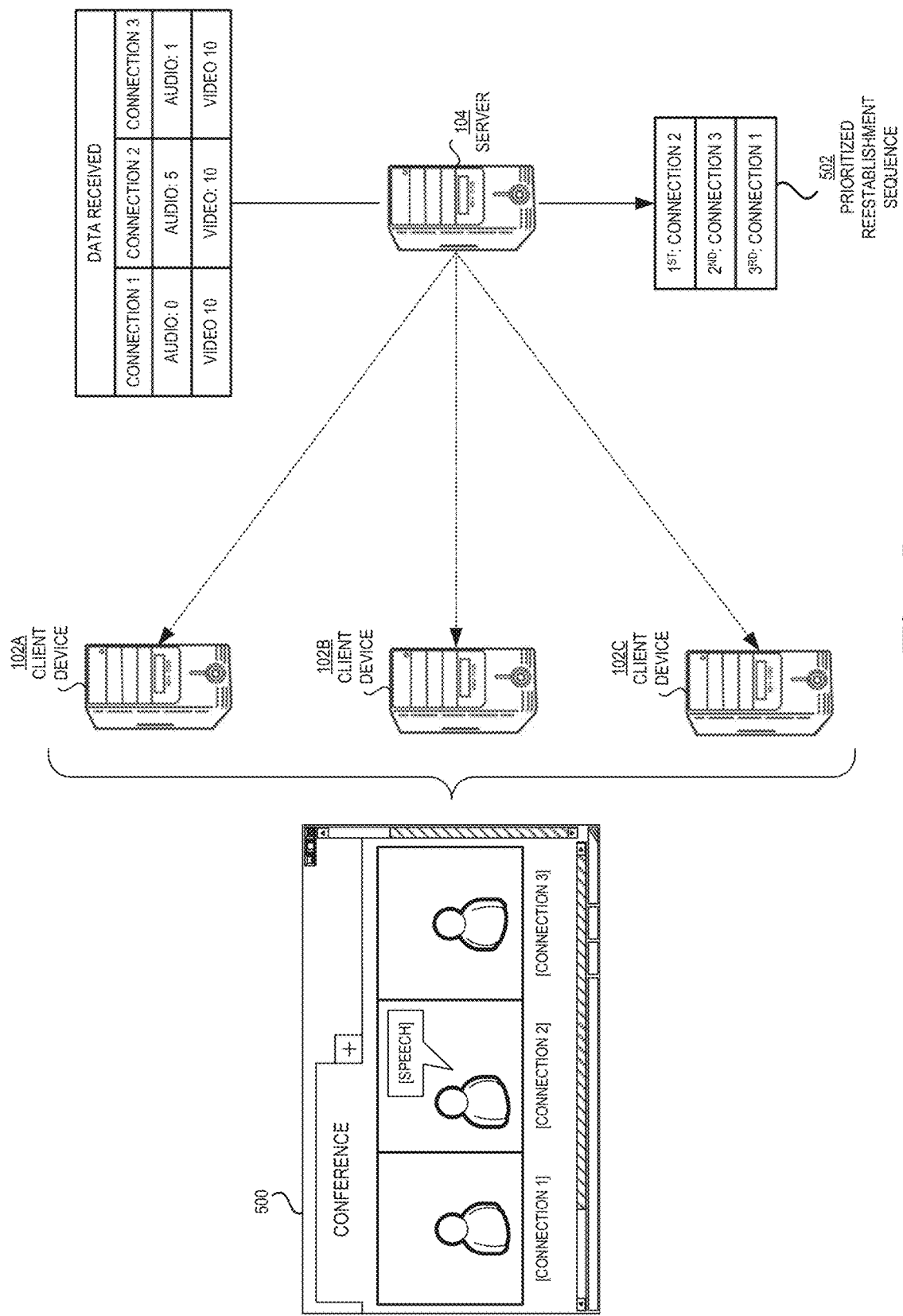
FIG. 5 is a block diagram depicting prioritized restoration of multiple connections based on connection state factors including a type of pending communications queued for each connection according to some embodiments.

FIG. 5 illustrates an embodiment in which a server 104 implements prioritized reestablishment of connections, and in which the reestablishment sequence is based on a type of data transmitted over each connection.

In the example shown, the server 104 may establish separate connections with each client device 102A, 102B, 102C for an interactive, substantially real-time multi-user communication session among the client devices. During the communication session, the server 104 may receive multi-media data (e.g., audio and video data) from each client device via a corresponding connection, and send the multi-media data (or data derived therefrom) to each other client device via respective connections to those devices.

The client devices 102A, 102B, 102C may include application software that causes presentation of an interface 500. Each client device may present the interface 500 to display video based on video data generated by other client devices (which may or may not be pre-processed by the server 104), and to play audio based on audio data generated by the other client devices (which may or may not be pre-processed by the server 104).

During the communication session, an interruption event may occur as described in greater detail above. For example, a software update may be installed on the server 104, causing interruption of the connections with the client devices 102A-102C. When an interruption event occurs during a communication session such as the illustrated example, it may be more important to minimize latency associated with receipt of data from a client device being used by an active speaker than to minimize latency associated with receipt of data from client devices being used by other users.

In some embodiments, to determine which client device is being used by an active speaker, the server 104 can track the types of data received over each connection. While each client device may be providing approximately the same amount of video data (assuming that each client device has a video camera turned on and providing approximately the same resolution video data), the client device being used by an active speaker may be providing significantly more audio data than other users. For example, in comparison with client devices used by inactive speakers, a client device being used by an active speaker may be providing about 2× more audio data, about 5× more audio data, about 10× more audio data, about 50× more audio data, or more. In many cases, inactive speakers may have their microphones muted and may be providing no or substantially no audio data. The server 104 can keep track of the amount of audio data received over each connection (e.g., since the start of the communication session, using a sliding window of time, etc.). When an interruption event occurs and the server 104 is determining a prioritized reestablishment sequence, the server 104 can prioritize connections with client devices providing the most audio data, and thus the client devices that are most likely to be used by active speakers.

In the example shown, during most recent period of time tracked by the server 104 before an interruption event, each of the client devices 102A-102C provided the same or substantially the same amount of video data. However, client device 102B provided significantly more audio data than the other two client devices 102A and 102C. Thus, when the server 104 executes a prioritized connection restoration routine (such as routine 300, above) to generate a prioritized reestablishment sequence 502, the server 104 may determine that the connection with client device 102B is to be reestablished first.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of a computing system comprising computer-readable memory and one or more computer processors configured to execute specific instructions,
determining that an interruption event associated with a plurality of network connections has occurred;
determining, based on connection state data associated with network connections of the plurality of network connections, a reestablishment sequence according to which at least a subset of the plurality of network connections are to be reestablished after the interruption event, wherein determining the reestablishment sequence comprises:
determining, based at least partly on the connection state data, a first quantity of pending communications to be sent over a first network connection of the plurality of network connections;
determining, based at least partly on the connection state data, a second quantity of pending communications to be sent over a second network connection of the plurality of network connections; and
determining, based at least partly on the second quantity being greater than the first quantity, that the second network connection is to be reestablished prior to the first network connection; and
reestablishing the subset of the plurality of network connections according to the reestablishment sequence.

2. The computer-implemented method of claim 1,
further comprising establishing a network connection of the plurality of network connections with a second computing system using a handshake according to one of: Transmission Control Protocol ("TCP"), User Datagram Protocol ("UDP"), or Scalable Reliable Datagram Protocol ("SRD"), and
wherein the network connection is reestablished without executing the handshake a second time.

3. The computer-implemented method of claim 1, further comprising executing a virtual machine instance and a network-based storage client in separate computing processes of the computing system, wherein the virtual machine instance uses the network-based storage client to access data stored on a second computing system, and wherein interruption of the plurality of network connections occurs based on installing an update to the network-based storage client during execution of the virtual machine instance.

4. The computer-implemented method of claim 1, further comprising:
determining, subsequent to reestablishment of a network connection, that at least a portion of data communications sent by the computing system to a second computing system over the network connection have not been acknowledged by the second computing system; and
resending at least the portion of the data communications to the second computing system over the network connection.

5. A system comprising:
computer-readable memory storing executable instructions; and
one or more processors in communication with the computer-readable memory and programmed by the executable instructions to:
determine that an interruption event associated with a plurality of network connections has occurred;
determine, based on connection state data associated with network connections of the plurality of network connections, a reestablishment sequence according to which at least a subset of the plurality of network connections are to be reestablished after the interruption event, wherein to determine the reestablishment sequence, the one or more processors:
determine, based at least partly on the connection state data, a first amount of pending data to be sent over a first network connection of the plurality of network connections;
determine, based at least partly on the connection state data, a second amount of data to be sent over a second network connection of the plurality of network connections; and
determine, based at least partly on the second amount being less than the first amount, that the second network connection is to be reestablished prior to the first network connection; and
reestablish the subset of the plurality of network connections according to the reestablishment sequence.

6. The system of claim 5, wherein the one or more processors are further programmed to establish a network connection of the plurality of network connections with a second computing system using a handshake according to one of: Transmission Control Protocol ("TCP"), User Datagram Protocol ("UDP"), or Scalable Reliable Datagram Protocol ("SRD"), wherein the network connection is reestablished without executing the handshake a second time.

7. The system of claim 5, wherein the one or more processors are further programmed to execute a virtual machine instance and a network-based storage client in separate computing processes, wherein the virtual machine instance uses the network-based storage client to access data stored on a computing system, and wherein interruption of the plurality of network connections occurs based on installing an update to the network-based storage client during execution of the virtual machine instance.

8. The system of claim 5, wherein the one or more processors are further programmed to:
determine, subsequent to reestablishment of a network connection, that at least a portion of data communications sent to a computing system over the network connection have not been acknowledged by the computing system; and
resend at least the portion of the data communications to the computing system over the network connection.

9. A computer-implemented method comprising:
under control of a computing system comprising computer-readable memory and one or more computer processors configured to execute specific instructions,
determining that an interruption event associated with a plurality of network connections has occurred;
determining, based on connection state data associated with network connections of the plurality of network connections, a reestablishment sequence according to which at least a subset of the plurality of network connections are to be reestablished after the interruption event, wherein determining the reestablishment sequence comprises:
determining, based at least partly on the connection state data, a first performance parameter of a first network connection for communication of first pending data;
determining, based at least partly on the connection state data, a second performance parameter of a second network connection for communication of second pending data; and
determining, based at least partly on a comparison of the first performance parameter and the second performance parameter, that the second network connection is to be reestablished prior to reestablishment of the first network connection; and
reestablishing the subset of the plurality of network connections according to the reestablishment sequence.

10. The computer-implemented method of claim 9, wherein the first performance parameter comprises a first rate at which data sent over the first network connection is to be processed upon receipt, wherein the second performance parameter comprises a second rate at which data sent over the second network connection is to be processed upon receipt, and wherein the second rate is greater than the first rate.

11. The computer-implemented method of claim 9, further comprising:
establishing, with a second computing system, a network connection of the plurality of network connections; and
storing, in persistent storage of the computing system, connection metadata to be used in reestablishing communication with the second computing system via the network connection;
wherein reestablishing the subset of the plurality of network connections comprises sending, to the second computing system, a reestablishment communication comprising at least a portion of the connection metadata, and and wherein the network connection is reestablished based at least partly on the reestablishment communication.

12. The computer-implemented method of claim 9, further comprising establishing a network connection of the plurality of network connections with a second computing system using a handshake according to one of: Transmission Control Protocol ("TCP"), User Datagram Protocol ("UDP"), or Scalable Reliable Datagram Protocol ("SRD"), and wherein the network connection is reestablished without executing the handshake a second time.

13. The computer-implemented method of claim 9, further comprising executing a virtual machine instance and a network-based storage client in separate computing processes of the computing system, wherein the virtual machine instance uses the network-based storage client to access data stored on a second computing system, and wherein interruption of the plurality of network connections occurs based on installing an update to the network-based storage client during execution of the virtual machine instance.

14. The computer-implemented method of claim 9, further comprising:

determining, subsequent to reestablishment of a network connection, that at least a portion of data communications sent by the computing system to a second computing system over the network connection have not been acknowledged by the second computing system; and resending at least the portion of the data communications to the second computing system over the network connection.

\* \* \* \* \*

UNITED STATES PATENT AND TRADEMARK OFFICE
CERTIFICATE OF CORRECTION

| | | |
|---|---|---|
| PATENT NO. | : 11,917,017 B1 | |
| APPLICATION NO. | : 17/936537 | |
| DATED | : February 27, 2024 | |
| INVENTOR(S) | : Valentin-Gabriel Priescu | |

It is certified that error appears in the above-identified patent and that said Letters Patent is hereby corrected as shown below:

In the Claims

In Column 21, Claim 11, Line 4, delete "and wherein" and insert --wherein--.

Signed and Sealed this
Twenty-first Day of May, 2024

Katherine Kelly Vidal
*Director of the United States Patent and Trademark Office*